E. NORTON.
METAL CAN BODY OR COMPOSITE BLANK THEREFOR.
APPLICATION FILED MAY 9, 1912.
1,114,508.
Patented Oct. 20, 1914.
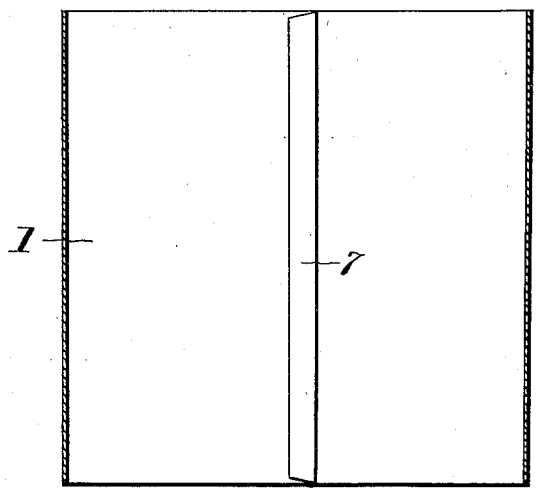
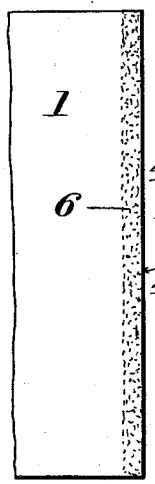
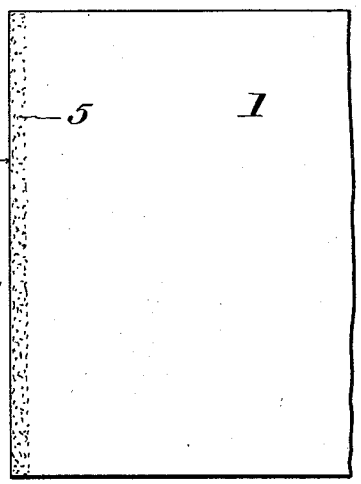
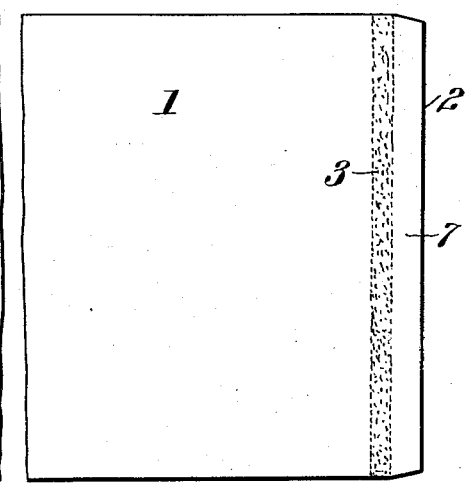

UNITED STATES PATENT OFFICE.

EDWIN NORTON, OF HAMILTON, BERMUDA.

METAL CAN-BODY OR COMPOSITE BLANK THEREFOR.

1,114,508.

Specification of Letters Patent.

Patented Oct. 20, 1914.

Application filed May 9, 1912. Serial No. 696,180.

*To all whom it may concern:*

Be it known that I, EDWIN NORTON, a citizen of the United States, residing at Hamilton, in Bermuda, have invented certain new and useful Improvements in Metal Can-Bodies or Composite Blanks Therefor, of which the following is a description, reference being had to the accompanying drawing and to the figures of reference marked thereon.

The invention relates to new and useful improvements in metal can bodies or the composite blanks for forming the same, and more especially to a can body which is constructed with a lap seam.

It is desirable to provide the inner surface of a can body with a coating of lacquer, aluminum or other resisting material which is not acted upon by the acids or other attacking ingredients contained in the contents of the can. Where the inner surface of the can body is lacquered prior to the soldering of the side seam, the heat applied to the solder in forming the side seam, discolors the lacquer or coating on the inner face of the can body, and produces a can body which is objectionable in appearance.

An object of the present invention is to construct the can body, and the blank forming the same, so that when the side seam is soldered, the inner lacquered surface adjacent the side seam is protected from the heat, so that the lacquer will not be discolored.

In the drawings, Figure 1 is a sectional view through a can body having my improvement applied thereto; Fig. 2 is a plan view of the inner surface of a composite blank used in forming my improved can body; Fig. 3 is a view of one edge of the blank from the opposite side thereof; Fig. 4 is an edge view of the blank; and Fig. 5 is a sectional view through the can body, showing the construction at the lap seam.

In carrying out the invention, the blank which is to form the can body is preferably provided with solder strips, which are so disposed upon the blank that when the blank is brought into position for the side seam, the solder strips will be disposed one upon the other. The blank is further provided with a part which projects beyond the solder strip at one end of the blank, which projecting part is adapted to be folded back on the inner face of the blank, so that the inner exposed face of the can body at the side seam, (which is the inner face of the folded back portion) is so far removed from the point where the solder secures the overlapped parts of the blank, that the heat will not injure the lacquer or coating on the inner face of said folded back portion, and consequently the inner lacquered surface of the can body will not be discolored.

Referring more in detail to the drawing, my improved composite can body blank 1 is shaped so that the same may be formed into a can body. Said blank adjacent the edge 2 is formed with a solder strip 3 which extends entirely across the blank. Said blank adjacent the other edge 4 is formed with a solder strip 5 on the front face, as viewed in Fig. 2, and also with a solder strip 6 on the other face, as viewed in Fig. 3. The solder strips 5 and 6 when subjected to heat melt and connect the edges of the blank forming the side seam for the can body.

The blank, except for the parts where the solder strips are applied, is provided with a resisting coating of lacquer, aluminum or any other suitable material. This coating may be applied to both sides of the blank, if desired, and will at least be applied to both sides of the part of the blank 7 which projects beyond the solder strip 3.

In the forming of the can body, the projecting portion 7 is folded back on to the blank, as shown in Fig. 4, so that the edge of the fold 8 is adjacent the edge of the solder strip 3. The blank is then curved, so that the edge 4 overlaps the edge of the fold 8 at the other side of the blank, and the inwardly folded portion 7 is on the inside of the can body. This inwardly projecting portion 7 is of sufficient width, so as to extend slightly beyond the edge 4. When the heat is applied to the lap seam, so as to join the lapped edges, the inwardly folded part 7 is a sufficient distance from said point of application of the heat so that the inner surface of said folded part will not be sufficiently heated to discolor the lacquer. As a consequence, when the body is formed from my improved blank, the inner lacquered surface of the body will not be in any way discolored.

It is obvious that minor changes in the details of construction and the arrangement of parts may be made, without departing from the spirit of the invention.

It is also obvious that while I have described the use of a solder strip for uniting the overlapped edges, that I have used this term in its broader sense, and that pure tin, or any other similar material is intended to be covered thereby.

Having thus described my invention, what I claim as new and desire to secure by Letters Patent, is:—

A can body comprising a metal sheet having on the inner surface thereof a resisting coating, the outer side edge of said sheet overlapping the inner side edge thereof and connected thereto by solder, said inner side edge being projected beyond the connecting line of the side edges and folded back across said connecting line so as to protect the inner surface of said can body from discoloring when heat is applied for soldering the side edges.

In testimony whereof, I affix my signature, in the presence of two witnesses.

EDWIN NORTON.

Witnesses:
A. W. NORTON,
FREDK. V. HAAS.